United States Patent [19]
Saikaly et al.

[11] Patent Number: 5,893,056
[45] Date of Patent: Apr. 6, 1999

[54] METHODS AND APPARATUS FOR GENERATING NOISE SIGNALS FROM SPEECH SIGNALS

[75] Inventors: Madeleine Saikaly, Montreal; Rafi Rabipour, Cote St. Luc, both of Canada

[73] Assignee: Northern Telecom Limited, Montreal, Canada

[21] Appl. No.: 839,830

[22] Filed: Apr. 17, 1997

[51] Int. Cl.$^6$ ............................................. G10L 9/00
[52] U.S. Cl. .................... 704/226; 455/227; 455/228; 455/223
[58] Field of Search ................... 704/226, 227, 704/228, 233, 223

[56] References Cited

U.S. PATENT DOCUMENTS

| | | | |
|---|---|---|---|
| 3,991,287 | 11/1976 | May, Jr. et al. | 179/170.2 |
| 4,354,056 | 10/1982 | Brantingham | 704/264 |
| 4,630,304 | 12/1986 | Borth et al. | 704/226 |
| 5,119,425 | 6/1992 | Rosentrach et al. | 704/258 |
| 5,307,441 | 4/1994 | Tzeng | 704/226 |
| 5,475,712 | 12/1995 | Sasaki | 375/24 |
| 5,537,509 | 7/1996 | Swaminathan et al. | 395/2.37 |
| 5,659,622 | 8/1997 | Ashley | 704/226 |
| 5,699,477 | 12/1997 | McCree | 704/223 |

FOREIGN PATENT DOCUMENTS

| | | | |
|---|---|---|---|
| 0 627 725 A2 | 5/1994 | European Pat. Off. | G10L 3/00 |
| WO 96 34382A | 10/1996 | WIPO | G10L 3/00 |

OTHER PUBLICATIONS

U.S. Application No. 08/431,224, Chu, et al., filed Apr. 28, 1995.

Primary Examiner—David R. Hudspeth
Assistant Examiner—Daniel Abebe
Attorney, Agent, or Firm—C. W. Junkin

[57] ABSTRACT

In methods and apparatus for generating an LPC-encoded noise signal from an LPC-encoded speech signal, excitation parameters of the LPC-encoded speech signal for a current frame are randomized upon detection of speech in the current frame. For frames in which no speech is detected, LPC coefficients and frame energy for the current frame may be replaced with respective averages calculated over the current frame and a plurality of preceding frames. For frames in which speech is detected, LPC coefficients for the current frame may be replaced with respective averages of LPC coefficients used to replace LPC coefficients of an immediately previous frame. The comfort noise generation technique is particularly suitable for use in echo suppressors for digital cellular radio systems.

27 Claims, 2 Drawing Sheets

1

METHODS AND APPARATUS FOR GENERATING NOISE SIGNALS FROM SPEECH SIGNALS

FIELD OF THE INVENTION

This invention relates generally to methods and apparatus for generating noise signals from speech signals, and more particularly to methods and apparatus for generating noise signals from LPC-encoded speech signals.

BACKGROUND OF THE INVENTION

Echo is a common problem in telecommunications systems. Echo can be very annoying to telecommunications system users, particularly in telecommunications systems having relatively long transmission delays, as for example satellite telecommunications systems and cellular radio telecommunications systems. Consequently, several methods for suppressing echo have been developed.

In one known type of echo suppression, received signals are first processed to determine whether echo is present. If echo is detected, the received signal is processed to suppress the echo. If no echo is detected, no echo suppression is applied.

In one known form of echo suppression, signals containing echo are replaced by a comfort noise signal to eliminate the echo. The comfort noise may be generated by a variety of known techniques.

In one known method for generating comfort noise from an LPC-encoded signal, internal gain and synthesis filter coefficients for a short interval of background noise are used with a pseudorandom excitation provided by a pseudorandom excitation generator or a noise excitation codebook. See, for example, U.S. Pat. No. 5,475,712 entitled Voice Coding Communication System and Apparatus Therefor issued in the name of S. Sasaki on Dec. 12, 1995, and U.S. Pat. No. 5,537,509 entitled Comfort Noise Generation of Digital Communication Systems issued in the names of K. Swaminathan et al on Jul. 16, 1996. Unfortunately, these methods of generating comfort noise provide a comfort noise which sounds somewhat unnatural and which may be discontinuous with background noise present in parts of the speech signal for which no echo is detected. This can lead to distinguishable and annoying discontinuities in the perception of background noise by the user of the telecommunications system.

Consequently, there is a need for a comfort noise generator which provides a more natural and continuous comfort noise for use in echo suppression applications and the like.

U.S. patent application Ser. No. 08/431,224 entitled Methods and Apparatus for distinguishing Speech Intervals from Noise Intervals in Speech Signals and filed in the names of C. C. Chu et al on Apr. 28, 1995 discloses LPC speech encoders and decoders in which LPC coefficients of non-speech frames are averaged over a plurality of consecutive frames during encoding or decoding operations to provide background noise which sounds more natural. Low pass filtering of the resulting signal is also added to make the background noise sound even more natural.

SUMMARY OF THE INVENTION

An object of this invention is to provide methods and apparatus for generating comfort noise from an LPC-encoded speech signal, the comfort noise being relatively natural-sounding and substantially continuous with background noise in the LPC-encoded speech signal.

One aspect of the invention provides a method for generating an LPC-encoded noise signal from an LPC-encoded speech signal. The method comprises detecting whether speech is present in each frame of the LPC-encoded speech signal, and upon detection of speech in a current frame, randomizing excitation parameters of the LPC-encoded speech signal for the current frame.

The method may further comprise replacing LPC coefficients of a frame of the LPC-encoded speech signal with respective average values of the LPC coefficients calculated over a plurality of preceding frames.

The method may further comprise replacing a frame energy of a frame of the LPC-encoded speech signal with an average value of the frame energy calculated over a plurality of preceding frames. In this case, the steps of replacing LPC coefficients and frame energy may comprise replacing LPC coefficients and frame energy for the current frame with respective averages of LPC coefficients and frame energy used to replace LPC coefficients and frame energy of an immediately previous frame for frames in which speech is detected. For frames in which no speech is detected and the frame energy exceeds an average frame energy calculated for a plurality of preceding frames, the step of replacing LPC coefficients and frame energy may comprise replacing LPC coefficients and frame energy for the current frame with respective averages calculated over the current frame and a plurality of preceding frames.

The method may further comprise, for frames in which no speech is detected and the frame energy is lower than an average frame energy calculated for a plurality of preceding frames, maintaining the LPC coefficients and the frame energy for the current frame.

Alternatively, the method may further comprise, for frames in which no speech is detected and the frame energy is lower than an average frame energy calculated for a first plurality of preceding frames, replacing LPC coefficients and frame energy for the current frame with respective averages calculated over the current frame and a second plurality of preceding frames, the second plurality being smaller than the first plurality.

Alternatively, the respective averages may be exponential averages calculated using a first weighting factor for the current frame. In this case, for frames in which no speech is detected and the frame energy is lower than the exponential average of the frame energy calculated for a previous frame, the LPC coefficients and frame energy may be replaced with respective exponential averages calculated over the current frame and preceding frames using a second weighting factor for the current frame, the second weighting factor being greater than the first weighting factor.

Another aspect of the invention provides apparatus for generating an LPC-encoded noise signal from an LPC-encoded speech signal. The apparatus comprises a processor and a storage medium for storing instructions for execution by the processor. The instructions comprise instructions for detecting whether speech is present in each frame of the LPC-encoded speech signal, and instructions for randomizing excitation parameters of the LPC-encoded speech signal for the current frame upon detection of speech in a current frame.

Yet another aspect of the invention provides a processor-readable storage medium storing instructions for execution by a processor. The instructions comprise instructions for detecting whether speech is present in each frame of the LPC-encoded speech signal, and instructions for randomizing excitation parameters of the LPC-encoded speech signal for the current frame upon detection of speech in a current frame.

The above methods and apparatus provide LPC-encoded noise which is relatively natural-sounding and substantially continuous with background noise in the LPC-encoded speech signal.

BRIEF DESCRIPTION OF THE DRAWINGS

Embodiments of the invention are described below, by way of example only, with reference to accompanying drawings, in which.

DETAILED DESCRIPTION OF THE EMBODIMENTS

Figure 1:
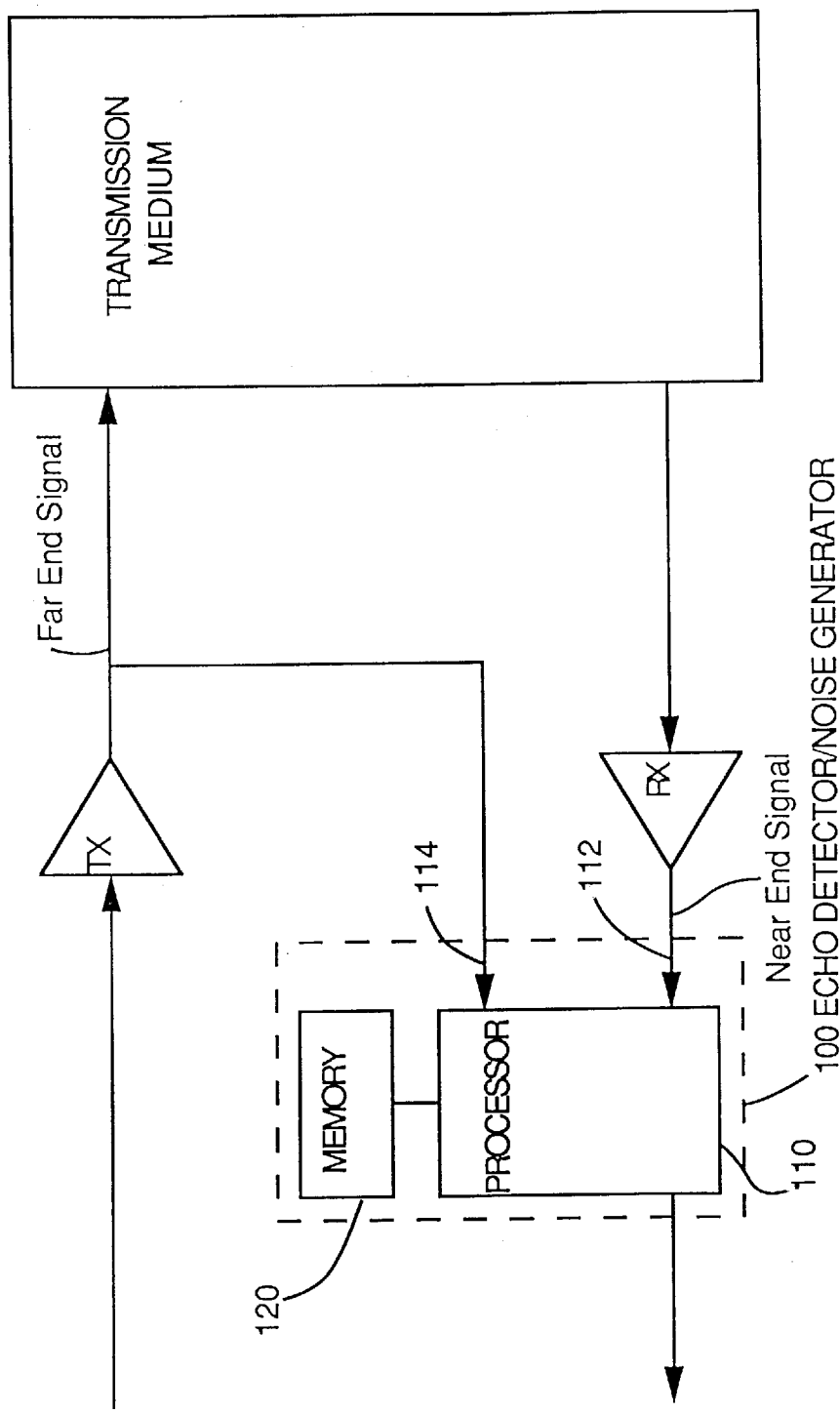
FIG. 1 is a block schematic diagram of a telecommunications system including a comfort noise generator according to an embodiment of the invention.

FIG. 1 is a block schematic diagram of a telecommunications system including a comfort noise generator 100 according to an embodiment of the invention.

The comfort noise generator 100 comprises a processor 110 and a processor-readable storage medium in the form of a memory 120 which stores instructions for execution by the processor 110. The processor 110 has a near end signal input port 112 on which it receives an LPC-encoded near end signal in the form of a VSELP-generated bit stream, and a far end signal input port 114 on which it receives an LPC-encoded far end signal in the form of a VSELP-generated bit stream. (The VSELP codec is defined in the IS-136 standard of the Telecommunications Industry Association (TIA).)

The processor 110 executes instructions stored in the memory 120 to process the near end and far end signals so as to detect echo of the far end signal in the near end signal as described in a copending patent application entitled Method and Apparatus for Detecting Echo and filed in the names of Dominic Ho et al on the same date as this patent application.

When the processor 110 detects echo in the near end signal, it executes further instructions to generate comfort noise from the LPC-encoded near end speech signal as described below.

Figure 2:
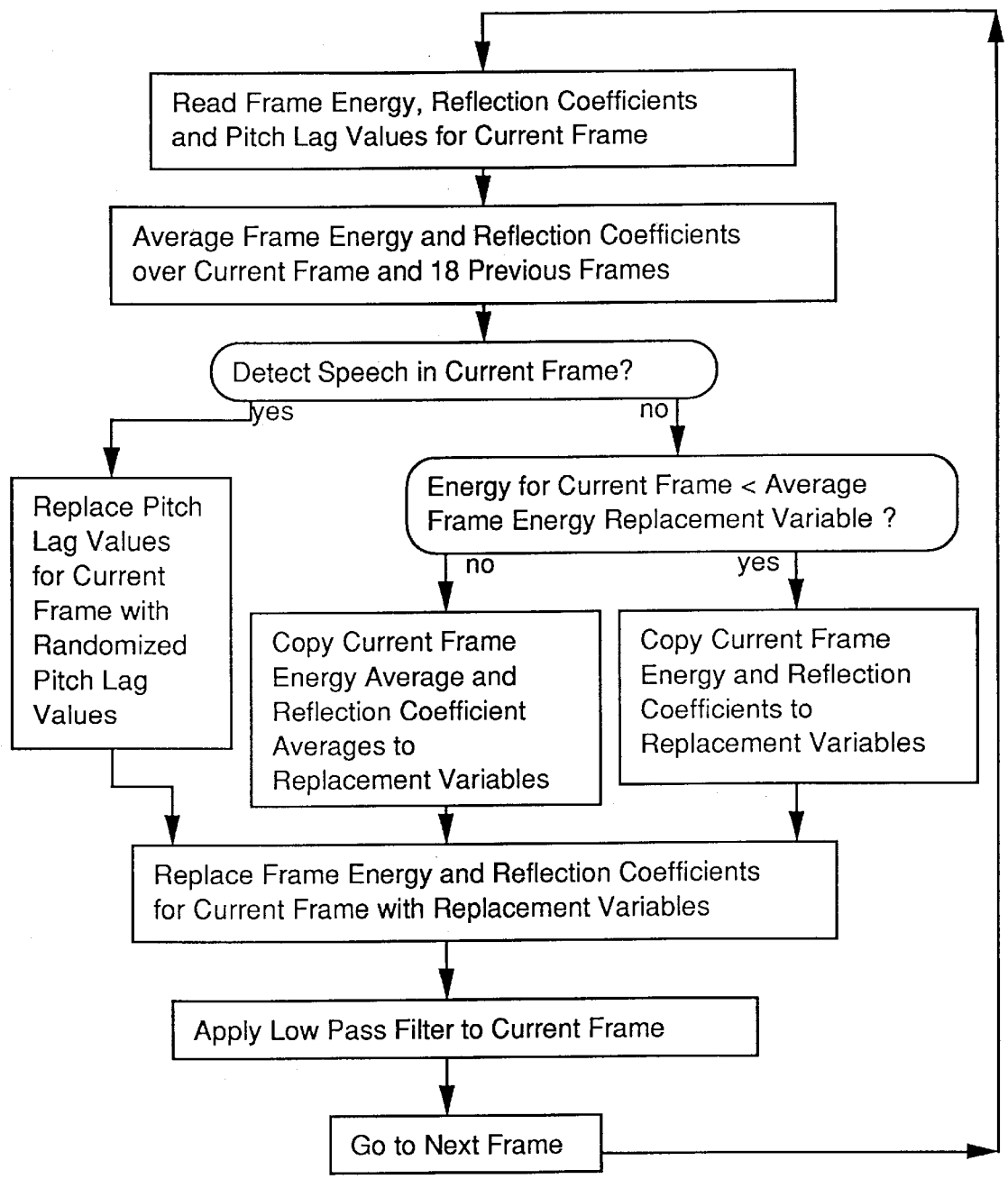
FIG. 2 is a flow chart showing steps in a method for generating noise according to an embodiment of the invention.

FIG. 2 is a flow chart showing steps performed by the processor 110 according to the instructions stored in the memory 120 to generate the comfort noise signal.

For each successive 20 ms time interval (called a "frame"), the processor 110 receives a set of LPC coefficients, including 10 reflection coefficients, $k_1$ to $k_{10}$ and a frame energy value, $R_0$, and a set of excitation parameters including four pitch lag values, $lag_1$ to $lag_4$. The processor 110 executes stored instuctions to average the frame energy, $R_0$, over the current frame and the previous 18 frames to compute an average frame energy, $R_0^{avg}$. Similarly, the processor 110 executes stored instructions to average each of the ten reflection coefficients, $k_i$, over the current frame and the previous 18 frames to compute ten average reflection coefficients, $k_i^{avg}$.

The processor 110 executes further stored instructions to determine whether the current frame of the LPC-encoded near end signal contains speech sounds. (A suitable set of instructions is described in U.S. patent application Ser. No. 08/431,224 entitled Methods and Apparatus for Distinguishing Speech Intervals from Noise Intervals in Speech Signals and filed in the names of C. C. Chu et al on Apr. 28, 1995 which is hereby incorporated in its entirety by reference).

If the processor 110 determines that the current frame of the LPC-encoded near end signal contains no speech sounds, the processor 110 executes further stored instructions to compare the frame energy for the current frame to an average frame energy, $R_0^{stable}$, calculated over a plurality of preceding frames. If the current frame energy is lower than $R_0^{stable}$, the processor 110 executes further stored instructions to copy the current frame energy and the current reflection coefficients to variables, $R_0^{stable}$ and $k_i^{stable}$. The excitation parameters including the four pitch lag values, $lag_i$, are left unchanged.

If the current frame energy is not lower than $R_0^{stable}$, the processor 110 executes further stored instructions to copy the average frame energy, $R_0^{avg}$, and the average reflection coefficients, $k_i^{avg}$, calculated for the current frame to the variables, $R_0^{stable}$ and $k_i^{stable}$, which are later used to replace the frame energy and reflection coefficients for the current frame, $R_0$ and $k_i$. In this case, the excitation parameters including the four pitch lag values, $lag_i$, are left unchanged.

If the processor 110 determines that the current frame of the LPC-encoded near end signal contains speech sounds, the processor 110 executes further stored instructions to replace the four pitch lag values, $lag_i$, for the current frame with pitch lag values that are randomly selected from the values permitted for pitch lags in the VSELP coding technique (i.e. from 20 to 146). In this case, the values of the variables $R_0^{stable}$ and $k_i^{stable}$ are not updated.

The processor 110 executes further stored instructions to replace the frame energy and reflection coefficients for the current frame, $R_0$ and $k_i$, with the stored variables $R_0^{stable}$ and $k_i^{stable}$ respectively. For frames in which speech sounds have not been detected, the values of $R_0^{stable}$ and $k_i^{stable}$ have been updated for the current frame. For frames in which speech sounds have been detected, the values of $R_0^{stable}$ and $k_i^{stable}$ have not been updated for the current frame, i.e. the values of $R_0^{stable}$ and $k_i^{stable}$ are the same as were used for an immediately previous frame.

The processor 110 then executes further stored instructions to apply a low pass filter to the resulting LPC-encoded bit stream.

The embodiment of the invention described above operates directly on an LPC-encoded speech signal to generate LPC-encoded comfort noise. Consequently, this embodiment can be used to generate comfort noise anywhere where the LPC-encoded bit stream is available. It is not necessary to locate the comfort noise generation at the LPC encoder or decoder, nor is it necessary to synthesize the speech signal from the LPC bit stream to generate the comfort noise. Moreover, this embodiment of the invention provides comfort noise which is relatively natural-sounding and substantially continuous with background noise in the speech signal, so as to substantially avoid subjectively annoying characteristics of comfort noise generated by at least some of the known alternative techniques for generating comfort noise.

In the above embodiment, the comfort noise is modelled based on recent frames which are reliably determined to contain noise rather than speech sounds. Frames determined by the speech detector to contain speech are not used to update the output LPC coefficients, $R_0^{stable}$ and $k_i^{stable}$ because these do not accurately describe the background noise. Moreover, frames determined by the speech detector to not contain speech sounds, but for which the energy $R_0$ is lower than the current value of $R_0^{stable}$ determined from previous frames are more likely to contain only background noise than the previous frames. Consequently, LPC coefficients for these frames are used preferentially over the averaged LPC coefficients of the previous frames to model the background noise. The LPC coefficients are averaged over successive frames as this has been determined to provide more natural-sounding comfort noise.

The embodiment described above may be modified without departing from the principles of the invention. For example, when the processor 110 determines that the current frame of the LPC-encoded near end signal contains no speech sounds and that the current frame energy is lower than $R_0^{stable}$, the processor 110 may execute stored instructions which compute a shorter term averages of the frame energy $R_0$ and the reflection coefficients $k_i$ than those calculated over 18 frames. For example, the shorter term averages could be calculated over 5 frames. The shorter term averages could then be copied to the variables, $R_0^{stable}$ and $k_i^{stable}$.

Alternatively, the averages could be exponential rather than arithmetic averages, and the short term averages could be calculated using a larger weighting factor for the current frame than is used for calculating the longer term averages.

The technique described above is not limited to VSELP-encoded speech signals. It could be applied to other CELP-encoded speech signals, for example those using standardized CELP codecs specified for GSM and CDMA wireless systems.

These and other variations are within the scope of the invention as defined in the claims below.

We claim:

1. A method for generating an LPC-encoded noise signal from an LPC-encoded speech signal, comprising:
   detecting whether speech is present in each frame of the LPC-encoded speech signal; and
   upon detection of speech in a current frame, randomizing excitation parameters of the LPC-encoded speech signal for the current frame and replacing corresponding excitation parameters of the LPC-encoded speech signal for the current frame with the randomized excitation parameters.

2. A method as defined in claim 1, wherein the step of randomizing excitation parameters comprises randomizing pitch lag values of the current frame.

3. A method as defined in claim 1, further comprising replacing LPC coefficients of a frame of the LPC-encoded speech signal with respective average values of the LPC coefficients calculated over a plurality of preceding frames.

4. A method as defined in claim 3, further comprising replacing a frame energy of a frame of the LPC-encoded speech signal with an average value of the frame energy calculated over a plurality of preceding frames.

5. A method as defined in claim 4, wherein the steps of replacing LPC coefficients and frame energy comprise:
   for frames in which speech is detected, replacing LPC coefficients and frame energy for the current frame with respective averages of LPC coefficients and frame energy used to replace LPC coefficients and frame energy of an immediately previous frame; and
   for frames in which no speech is detected and the frame energy exceeds an average frame energy calculated for a plurality of preceding frames, replacing LPC coefficients and frame energy for the current frame with respective averages calculated over the current frame and a plurality of preceding frames.

6. A method as defined in claim 5, further comprising, for frames in which no speech is detected and the frame energy is lower than an average frame energy calculated for a plurality of preceding frames, maintaining the LPC coefficients and the frame energy for the current frame.

7. A method as defined in claim 5, further comprising, for frames in which no speech is detected and the frame energy is lower than an average frame energy calculated for a first plurality of preceding frames, replacing LPC coefficients and frame energy for the current frame with respective averages calculated over the current frame and a second plurality of preceding frames, the second plurality being smaller than the first plurality.

8. A method as defined in claim 5, wherein the respective averages are exponential averages calculated using a first weighting factor for the current frame, further comprising, for frames in which no speech is detected and the frame energy is lower than the exponential average of the frame energy calculated for a previous frame, replacing LPC coefficients and frame energy for the current frame with respective exponential averages calculated over the current frame and preceding frames using a second weighting factor for the current frame, the second weighting factor being larger than the first weighting factor.

9. A method as defined in claim 4, further comprising:
   converting the LPC-encoded signal to a synthesized noise signal; and
   processing the synthesized noise signal with a low pass filter.

10. A method as defined in claim 5, wherein the LPC coefficients are averaged over between 15 and 25 consecutive 20 millisecond frames.

11. Apparatus for generating an LPC-encoded noise signal from an LPC-encode speech signal, comprising a processor and a storage medium for storing instructions for execution by the processor, the instructions comprising:
   instructions for detecting whether speech is present in each frame of the LPC-encoded speech signal; and
   instructions for randomizing excitation parameters of the LPC-encoded speech signal for the current frame and replacing corresponding excitation parameters of the LPC-encoded speech signal for the current frame with the randomized excitation parameters upon detection of speech in a current frame.

12. Apparatus as defined in claim 11, further comprising instructions for replacing LPC coefficients and frame energy of a frame of the LPC-encoded speech signal with respective average values of the LPC coefficients and frame energy calculated over a plurality of preceding frames.

13. Apparatus as defined in claim 12, wherein the instructions for replacing LPC coefficients and frame energy comprise:
   instructions for replacing LPC coefficients and frame energy for the current frame with respective averages of LPC coefficients and frame energy used to replace LPC coefficients of an immediately previous frame for frames in which speech is detected; and
   instructions for replacing LPC coefficients and frame energy for the current frame with respective averages calculated over the current frame and a plurality of preceding frames for frames in which no speech is detected and the frame energy exceeds an average frame energy calculated for a plurality of preceding frames.

14. Apparatus as defined in claim 13, further comprising instructions for maintaining the LPC coefficients for the current frame for frames in which no speech is detected and the frame energy is lower than an average frame energy calculated for a plurality of preceding frames.

15. Apparatus as defined in claim 13, further comprising instructions for replacing LPC coefficients and frame energy for the current frame with respective averages calculated over the current frame and a second plurality of preceding frames for frames in which no speech is detected and the frame energy is lower than an average frame energy calculated for a first plurality of preceding frames, the second plurality being smaller than the first plurality.

16. Apparatus as defined in claim 13, wherein the respective averages are exponential averages calculated using a first weighting factor for the current frame, the apparatus further comprising:
    instructions for replacing LPC coefficients and frame energy for the current frame with respective exponential averages calculated over the current frame and preceding frames using a second weighting factor for the current frame for frames in which no speech is detected and the frame energy is lower than the exponential average of the frame energy calculated for a previous frame, the second weighting factor being larger than the first weighting factor.

17. Apparatus as defined in claim 12, further comprising:
    instructions for converting the LPC-encoded signal to a synthesized noise signal; and
    instructions for processing the synthesized noise signal with a low pass filter.

18. A processor-readable storage medium storing instructions for generating an LPC-encoded noise signal from an LPC-encode speech signal, the instructions comprising:
    instructions for detecting whether speech is present in each frame of the LPC-encoded speech signal; and
    instructions for randomizing excitation parameters of the LPC-encoded speech signal for the current frame and replacing corresponding excitation parameters of the LPC-encoded speech signal for the current frame with the randomized excitation parameters upon detection of speech in a current frame.

19. A medium as defined in claim 18, further comprising instructions for replacing LPC coefficients and frame energy of a frame of the LPC-encoded speech signal with respective average values of the LPC coefficients and frame energy calculated over a plurality of preceding frames.

20. A medium as defined in claim 19, wherein the instructions for replacing LPC coefficients and frame energy comprise:
    instructions for replacing LPC coefficients and frame energy for the current frame with respective averages of LPC coefficients and frame energy used to replace LPC coefficients of an immediately previous frame for frames in which speech is detected; and
    instructions for replacing LPC coefficients and frame energy for the current frame with respective averages calculated over the current frame and a plurality of preceding frames for frames in which no speech is detected and the frame energy exceeds an average frame energy calculated for a plurality of preceding frames.

21. A medium as defined in claim 20, the instructions further comprising instructions for maintaining the LPC coefficients for the current frame for frames in which no speech is detected and the frame energy is lower than an average frame energy calculated for a plurality of preceding frames.

22. A medium as defined in claim 20, the instructions further comprising instructions for replacing LPC coefficients for the current frame with respective averages calculated over the current frame and a second plurality of preceding frames for frames in which no speech is detected and the frame energy is lower than an average frame energy calculated for a first plurality of preceding frames, the second plurality being smaller than the first plurality.

23. A medium as defined in claim 20, wherein the respective averages are exponential averages calculated using a first weighting factor for the current frame, the instructions further comprising:
    instructions for replacing LPC coefficients and frame energy for the current frame with respective exponential averages calculated over the current frame and preceding frames using a second weighting factor for the current frame for frames in which no speech is detected and the frame energy is lower than the exponential average of the frame energy calculated for a previous frame, the second weighting factor being larger than the first weighting factor.

24. A medium as defined in claim 19, the instructions further comprising:
    instructions for converting the LPC-encoded signal to a synthesized noise signal; and
    instructions for processing the synthesized noise signal with a low pass filter.

25. A method for generating an LPC-encoded noise signal from an LPC-encoded speech signal, comprising:
    detecting frames of an LPC-encoded speech signal;
    detecting whether speech is present in each frame of the LPC-encoded speech signal; and
    upon detection of speech in a current frame, randomizing excitation parameters of the LPC-encoded speech signal for the current frame and replacing corresponding excitation parameters of the LPC-encoded speech signal for the current frame with the randomized excitation parameters.

26. A method for suppressing an echo in an LPC-encoded speech signal, comprising:
    detecting whether speech is present in each frame of the LPC-encoded speech signal; and
    upon detection of speech in a current frame, randomizing excitation parameters of the LPC-encoded speech signal for the current frame and replacing corresponding excitation parameters of the LPC-encoded speech signal for the current frame with the randomized excitation parameters to generate an echo-suppressed LPC-encoded speech signal.

27. A method for suppressing an echo in an LPC-encoded speech signal, comprising:
    detecting whether speech is present in each frame of the LPC-encoded speech signal;
    upon detection of speech in a current frame, randomizing excitation parameters of the LPC-encoded speech signal for the current frame and replacing corresponding excitation parameters of the LPC-encoded speech signal for the current frame with the randomized excitation parameters to generate an echo-suppressed LPC-encoded speech signal; and
    synthesizing a waveform from the LPC-encoded noise signal.

* * * * *